(12) United States Patent
Fladung

(10) Patent No.: US 8,066,317 B2
(45) Date of Patent: Nov. 29, 2011

(54) CABRIOLET TOP

(75) Inventor: Uwe Fladung, Dipperz (DE)

(73) Assignee: Webasto AG, Stockdorf (DE)

( * ) Notice: Subject to any disclaimer, the term of this patent is extended or adjusted under 35 U.S.C. 154(b) by 2 days.

(21) Appl. No.: 12/760,266

(22) Filed: Apr. 14, 2010

(65) Prior Publication Data
US 2010/0264686 A1 Oct. 21, 2010

(30) Foreign Application Priority Data
Apr. 15, 2009 (DE) .................. 10 2009 017 476

(51) Int. Cl.
*B60J 7/12* (2006.01)
*B60J 7/20* (2006.01)

(52) U.S. Cl. .............. 296/118; 296/107.12; 296/107.15; 296/107.08

(58) Field of Classification Search .................. 296/116, 296/118, 120.1, 107.11, 107.12, 107.15, 296/107.08
See application file for complete search history.

(56) References Cited

U.S. PATENT DOCUMENTS

| | | | | |
|---|---|---|---|---|
| 6,343,829 B2 * | 2/2002 | Busch | ...................... | 296/107.15 |
| 6,666,494 B2 * | 12/2003 | Antreich | .................. | 296/107.01 |
| 6,755,457 B2 * | 6/2004 | Grubbs | .................... | 296/107.09 |

FOREIGN PATENT DOCUMENTS

| | | |
|---|---|---|
| DE | 19801876 A1 | 7/1999 |
| DE | 10160240 A1 | 6/2003 |
| DE | 10160240 B4 | 6/2003 |

* cited by examiner

*Primary Examiner* — Jason S Morrow
(74) *Attorney, Agent, or Firm* — Marshall, Gerstein & Borun LLP

(57) ABSTRACT

A cabriolet top for a cabriolet vehicle for displacement between a closed position covering a vehicle interior and a storage position opening up the vehicle interior is proposed, comprising a pivotably mounted cabriolet-top linkage on which a rigid cabriolet-top element is arranged, the cabriolet-top element extending in the transverse direction of the vehicle, being adjacent, in the closed position of the cabriolet top, to a transverse post bounding a windscreen at the top, and, together with the cabriolet-top linkage, stretches open a foldable cabriolet-top cloth and, in the storage position of the cabriolet top, is arranged on the upper side in a cabriolet-top storage compartment such that the cabriolet-top cloth runs downwardly over a rear border of the cabriolet-top element. A rod is arranged on the cabriolet-top cloth on the rear side of the rigid cabriolet-top element, the rod extending between the border regions on both sides of the cabriolet top and, in the storage position of the cabriolet top, pre-stressing the cabriolet-top cloth downwardly in such a manner that, in a region visible from the outside of the vehicle, the cabriolet-top cloth runs at least substantially crease-free downwardly over the rear border of the cabriolet-top element into the cabriolet-top storage compartment.

12 Claims, 2 Drawing Sheets

CABRIOLET TOP

BACKGROUND OF THE INVENTION

1. Field of the Invention

The invention relates to a cabriolet top for a cabriolet vehicle for displacement between a closed position covering a vehicle interior and a storage position opening up the vehicle interior.

2. Related Technology

A cabriolet top of this type is known, for example, from DE 101 60 240 B4. Said known cabriolet top comprises a pivotably mounted cabriolet-top linkage that is arranged on both sides with respect to a longitudinal center plane of the vehicle and on which a rigid cabriolet-top element is arranged, said cabriolet-top element extending in the transverse direction of the vehicle and constituting a roof tip. In the closed position of the cabriolet top, said rigid cabriolet-top element is adjacent to a transverse post bounding a windscreen at the top. Together with the cabriolet-top linkage, the rigid cabriolet-top element stretches open a foldable cabriolet-top cloth in the closed position of the cabriolet top. In the storage position of the cabriolet top, the cabriolet-top linkage, the cabriolet-top cover and the rigid cabriolet-top element are received by a rear cabriolet-top storage compartment. In this case, the rigid cabriolet-top element forms a cabriolet-top storage-compartment cover. The cabriolet-top cloth is fastened to the rigid cabriolet-top element and covers the upper side thereof. The foldable region of the cabriolet-top cloth extends from the rear border of the cabriolet-top element in the direction of the vehicle rear. In the storage position, the cabriolet-top cloth runs downwardly over the rear border of the cabriolet-top element into the cabriolet-top storage compartment. In the case of the cabriolet top known from the publication DE 101 60 240 B4, an undesirable creasing visible from the outside of the vehicle may occur in the cabriolet-top-cloth region adjacent to the rear border.

Furthermore, it is known from practice to prevent the above-described creasing with the aid of cable pulls and deflecting eyes. In the storage position of the cabriolet top, the cable pulls pretension the cabriolet-top cloth downwardly in such a manner that the cabriolet-top cloth runs tautly and, in a region visible from the outside of the vehicle, in a substantially crease-free manner downwardly over the rear border of the cabriolet-top element into the cabriolet-top storage compartment. However, cable pulls of this type are associated with complicated installation, which in turn results in increased production costs for the cabriolet top. Furthermore there is the risk of the cables becoming tangled up upon actuation of the cabriolet top. "Severing" of the cables may even occur.

SUMMARY OF THE INVENTION

The invention provides a cabriolet top in which creasing of the cabriolet-top cloth in the region of the rear border of the cabriolet-top element in the storage position of the cabriolet top is effectively prevented in a structurally simple manner.

Accordingly, the invention provides a cabriolet top for a cabriolet vehicle for displacement between a closed position covering a vehicle interior and a storage position opening up the vehicle interior, comprising a pivotably mounted cabriolet-top linkage on which a rigid cabriolet-top element is arranged, said cabriolet-top element extending in a transverse direction of the vehicle, being adjacent, in the closed position of the cabriolet top, to a transverse post bounding a windscreen at the top, and, together with the cabriolet-top linkage, stretches open a foldable cabriolet-top cloth and, in the storage position of the cabriolet top, is arranged on an upper side in a cabriolet-top storage compartment such that the cabriolet-top cloth runs downwardly over a rear border of the cabriolet-top element, wherein a rod is arranged on the cabriolet-top cloth on the rear side of the rigid cabriolet-top element, said rod extending between border regions on both sides of the cabriolet top and, in the storage position of the cabriolet top, pre-stressing the cabriolet-top cloth downwardly in such a manner that, in a region visible from the outside of the vehicle, said cabriolet-top cloth runs at least substantially crease-free downwardly over the rear border of the cabriolet-top element into the cabriolet-top storage compartment.

It is consequently proposed, according to the invention, that a preferably elastically flexible rod is arranged on the cabriolet-top cloth on the rear side of the rigid cabriolet-top element, said rod extending between the cabriolet-top border regions arranged on both sides with respect to the longitudinal center plane of the vehicle and, in the storage position of the cabriolet top, pre-tensioning the cabriolet-top fabric downwardly in such a manner that, in a region visible from the outside of the vehicle, said cabriolet-top fabric runs at least substantially crease-free downwardly over the rear border of the cabriolet-top element into the cabriolet-top storage compartment. The rod consequently constitutes an additional bow that can be connected in a simple manner to the cabriolet-top cloth and which generates the required pre-tensioning of the cabriolet-top cloth, said pre-tensioning counteracting creasing in a region of the cabriolet-top cloth that is adjacent to the rear border of the rigid cabriolet-top element and is visible from the outside of the vehicle, in the storage position of the cabriolet top. Consequently, the preferably elastically flexible rod induces the required tensioning effect when the cabriolet top is put away in the cabriolet-top storage compartment.

In a preferred embodiment of the cabriolet top according to the invention, the rod is arranged in a pocket that is arranged on the lower side of the cabriolet-top cloth and extends between the two cabriolet top regions which are at the sides with respect to a vertical longitudinal center plane of the vehicle. For installation, the rod therefore, for example, simply has to be pushed into the pocket. As an alternative, the pocket which is already equipped with the rod may also be fixed to the lower side of the cabriolet-top cloth.

The pocket is expediently a separate element that is adhesively bonded or stitched to the cabriolet-top cloth. It is also conceivable to form the pocket integrally with the cabriolet-top cloth by corresponding stitching of the same.

In a specific embodiment of the cabriolet top according to the invention, the pocket comprises a fixing strip connected to the cabriolet-top cloth and a receiving section that adjoins said fixing strip, is movable in relation to the fixing strip, and receives the rod. In particular, the receiving section is designed as a hollow hem of the pocket which is formed from a fabric blank. For installation, the rod is pushed into the hollow hem.

In order to prevent the rod from slipping out of the pocket, the receiving section of the same is preferably closed or stitched laterally.

In order to ensure an adequate pre-tensioning so as to prevent creasing of the cabriolet-top cloth at the rear border region of the rigid cabriolet-top element, the pocket can have a curved profile in the transverse direction of the vehicle. The pocket profile, which is optimized for the particular cabriolet top or the particular rigid cabriolet-top element, is expediently determined empirically. For example, the curvature of the pocket follows a curvature of the rear border of the rigid cabriolet-top element.

The distance of the rod from the rear border of the rigid cabriolet-top element is also an empirically-obtained variable that is selected in a manner optimized for the particular cabriolet top. For example, the rod is arranged at a distance of between 20 mm and 150 mm from the rear border of the cabriolet-top element. The distance may vary with the profile of the rod.

In particular, the rod preferably has a round cross section, but may also have an angular or oval cross section. The diameter of the rod preferably lies within a range of between 2 mm and 8 mm.

Depending on the application, the rod may be manufactured from a material optimized in this regard. For example, the rod may be manufactured from metal, in particular a steel or a spring steel, from a plastic, a glass fiber material, or a carbon material.

Further advantages and advantageous refinements of the subject matter of the invention can be gathered from the description, the drawings, and the patent claims.

BRIEF DESCRIPTION OF THE DRAWINGS

An exemplary embodiment of a cabriolet top according to the invention is illustrated schematically in simplified form in the drawing and is explained in more detail in the description below. In the drawing.

DETAILED DESCRIPTION

Figure 1:
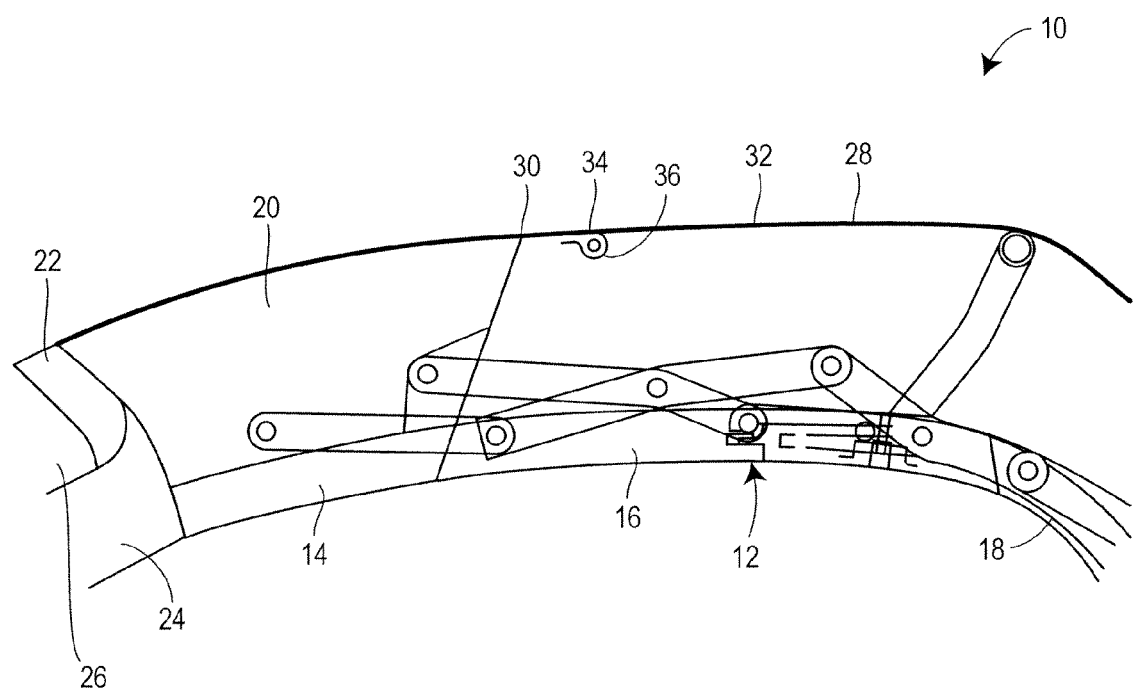
FIG. 1 shows a side view of a folding cabriolet top of a cabriolet vehicle in the closed position.

The drawing illustrates a folding cabriolet top 10 of a cabriolet vehicle that is otherwise not illustrated specifically. The folding cabriolet top 10, which is constructed symmetrically with respect to a vertical longitudinal center plane of the vehicle, is displaceable between a closed position illustrated in FIG. 1 and in which a vehicle interior is covered, and an opening-up position illustrated in FIG. 2 and in which said vehicle interior is opened up. Said folding cabriolet top comprises a cabriolet-top linkage 12 that forms a link system on both sides with respect to a vertical longitudinal center plane of the vehicle to actuate the folding cabriolet top 10 and in each case comprises a front frame part 14, a central frame part 16, and a rear frame part 18.

A rigid cabriolet-top element 20 that is designed as a rigid roof shell or roof tip extends between the front frame parts 14 on both sides of the cabriolet-top linkage 12. In the cabriolet-top closed position illustrated in FIG. 1, the front border of the rigid cabriolet-top element 20 is adjacent to a transverse post 22 that connects the "A pillars" 24 of the vehicle in question and bounds the upper border of a windscreen 26.

The rigid cabriolet-top element, which connects the two front frame parts 14 rigidly to each other, and the cabriolet-top linkage 16 serve to secure and to stretch open a cabriolet-top cloth 28 that extends between the lateral frame parts 14, 16, 18, which are arranged on both sides, and over the front rigid cabriolet-top element 20.

Figure 2:
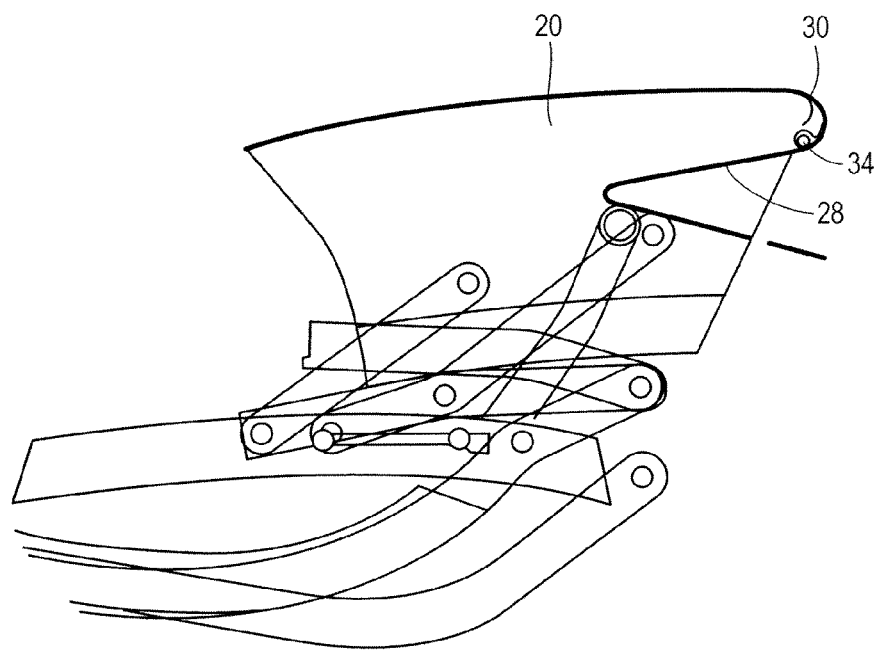
FIG. 2 shows a side view of the folding cabriolet top in the storage position thereof.

In the storage position illustrated in FIG. 2, the cabriolet-top linkage 12 and the cabriolet-top cloth 28 are removed from a rear cabriolet-top storage compartment. The rigid cabriolet-top element 20 is then arranged at the top and forms a cabriolet-top storage-compartment cover. The orientation of the rigid cabriolet-top element 20 in the storage position substantially corresponds to the orientation of the cabriolet-top element 20 in the closed position illustrated in FIG. 1, i.e. the outer side of the rigid cabriolet-top element 20 lies at the top in both positions. In the present case, a "concertina fold" is consequently carried out when the cabriolet top is opened.

As already described above, the cabriolet-top cloth 28 covers the front rigid cabriolet-top element 20 and is connected, in particular adhesively bonded, thereto via at least two joining regions 42 and 44. A rear border 30 of the cabriolet-top element 20 is adjoined by a foldable section 32 of the cabriolet-top cloth 28, which section extends as far as a rear joining region of the cabriolet-top cloth 28, said joining region being arranged in the region of the cabriolet-top storage compartment. In the storage position illustrated in FIG. 2, the foldable section 32 runs downwardly from the rear border 32 into the cabriolet-top storage compartment. In order to prevent an undesirable creasing that is visible from the outside of the vehicle from occurring adjacent to the rear border 30 of the cabriolet-top element 20 in the storage position of the cabriolet top, an elastically flexible rod is arranged on the inner side of the cabriolet-top cloth 28 on the rear side of the rear border 30 of the rigid cabriolet-top element 20, said rod pre-stressing the cabriolet-top cloth 28 downwardly in the storage position of the cabriolet top 10 in such a manner that said cabriolet-top cloth runs in a substantially crease-free manner over the rear border 30 of the cabriolet-top element 20. Consequently, in the storage position of the cabriolet top, the elastically flexible rod 34 spans that region of the cabriolet-top cloth 28 which lies between the elastically flexible rod 34 and the rear border 30 of the cabriolet-top element 20. The cabriolet-top cloth 28 therefore follows the folding edge defined by the rear border 30 of the cabriolet-top element 20.

To improve the visual appearance, i.e. to prevent undesirable creasing, the elastically flexible rod 34 therefore induces compulsory folding along the edge, which is formed by the rear border 30 of the rigid cabriolet-top element 20, and therefore the cabriolet-top cloth 28 is folded closely and continuously downwardly at the edge formed by the rear border 30.

Figure 3:
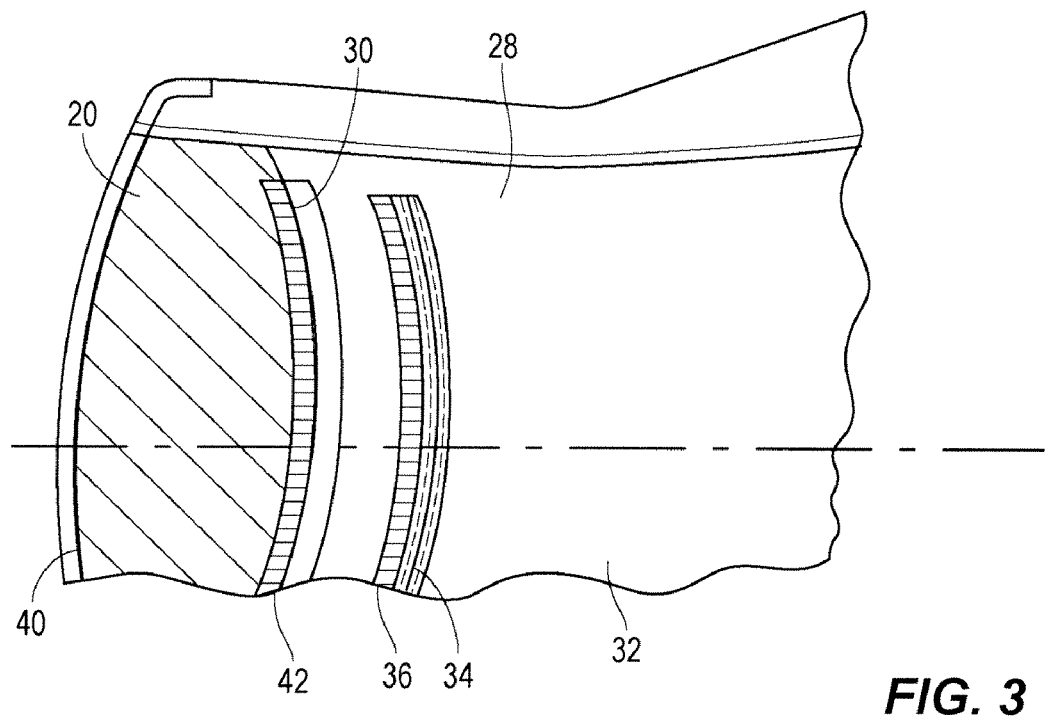
FIG. 3 shows a schematic bottom view of the cabriolet top.
Figure 4:
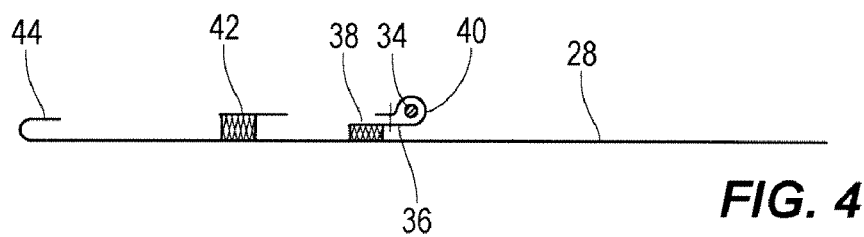
FIG. 4 shows a longitudinal section through a cabriolet-top cloth.
Figure 5:
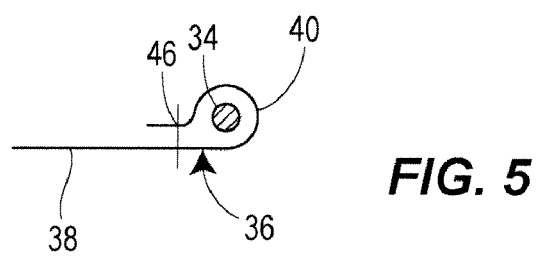
FIG. 5 shows a longitudinal section through a pocket for fixing a tensioning bow.

As can be gathered from FIGS. 3 to 5, the elastically flexible rod 34 is stitched into a pocket 36 which has a curved profile in the transverse direction of the vehicle, the curvature of the pocket 36 and the resultant curvature of the rod 34 being somewhat greater than the curvature of the rear border 30 of the rigid cabriolet-top element 20. The pocket 36 comprises a strip-shaped fixing region 38 which is adhesively bonded or welded to the lower side of the cabriolet-top cloth 28 and is adjoined on the rear side by a receiving section 40, which is formed by means of a seam 46 and is designed as a hollow hem, for the elastically flexible rod 34. The receiving region 40 is stitched laterally, and therefore the elastically flexible rod 34 is held captively by the pocket 36. The rod 34 is therefore stitched into the pocket 36.

In the present case, the distance between the elastically flexible rod 34 and the rear border 30 of the rigid cabriolet-top element 20 varies between 50 mm and 65 mm, but may also assume values optimized differently in a suitable manner in the case of other embodiments. In the present case, the rod 34 has a diameter of 4 mm and is formed from a round steel. However, as an alternative, it may also be formed, for example, from flat steel.

LIST OF REFERENCE NUMBERS

10 Folding cabriolet top
12 Cabriolet-top linkage
14 Front frame part
16 Central frame part
18 Rear frame part
20 Rigid cabriolet-top element
22 Transverse limb
24 A pillar
26 Windscreen
28 Cabriolet-top cloth
30 Rear border
32 Foldable region
34 Elastically flexible rod
36 pocket
38 Fixing region
40 Receiving region
42 Joining region
44 Joining region
46 Seam

The invention claimed is:

1. Cabriolet top for a cabriolet vehicle for displacement between a closed position covering a vehicle interior and a storage position opening up the vehicle interior, comprising a pivotably mounted cabriolet-top linkage on which a rigid cabriolet-top element is arranged, said cabriolet-top element extending in a transverse direction of the vehicle, being adjacent, in the closed position of the cabriolet top, to a transverse post bounding an upper border of a windscreen, and, together with the cabriolet-top linkage, stretches open a foldable cabriolet-top cloth and, in the storage position of the cabriolet top, is arranged on an upper side in a cabriolet-top storage compartment such that the cabriolet-top cloth runs downwardly over a rear border of the cabriolet-top element, wherein a rod is arranged on the cabriolet-top cloth on a rear side of the rigid cabriolet-top element, said rod extending between border regions on both sides of the cabriolet top and, in the storage position of the cabriolet top, pre-stressing the cabriolet-top cloth downwardly in such a manner that, in a region visible from the outside of the vehicle, said cabriolet-top cloth runs at least substantially crease-free downwardly over the rear border of the cabriolet-top element into the cabriolet-top storage compartment.

2. Cabriolet top according to claim 1, wherein the rod is arranged in a pocket that is arranged on a lower side of the cabriolet-top cloth and extends between two sides of the cabriolet top.

3. Cabriolet top according to claim 2, wherein the pocket is stitched or adhesively bonded to the cabriolet-top cloth.

4. Cabriolet top according to claim 2, wherein the pocket has a fixing strip connected to the cabriolet-top cloth and a receiving section which adjoins said fixing strip, is movable in relation to the fixing strip and receives the rod.

5. Cabriolet top according to claim 4, wherein the receiving section is closed laterally.

6. Cabriolet top according claim 2, wherein the pocket has a curved profile in the transverse direction of the vehicle.

7. Cabriolet top according to claim 1, wherein the rod is arranged at a distance of 2 mm to 15 mm from the rear border of the rigid cabriolet-top element.

8. Cabriolet top according to claim 1, wherein the rod has a diameter of 2 mm to 8 mm.

9. Cabriolet top according to claim 1, wherein the rod has a round cross section.

10. Cabriolet top according to claim 1, wherein the rod is manufactured from metal, plastic, a glass fiber material, or a carbon fiber material.

11. Cabriolet top according claim 1, wherein the rod is elastically flexible.

12. Cabriolet top according to claim 10, wherein the rod is manufactured from steel.

* * * * *